(12) United States Patent
Reed

(10) Patent No.: US 9,936,647 B2
(45) Date of Patent: Apr. 10, 2018

(54) AUTOMATED TRIMMING APPARATUS AND METHOD

(71) Applicant: Todd Reed, Fort Collins, CO (US)

(72) Inventor: Todd Reed, Fort Collins, CO (US)

( * ) Notice: Subject to any disclaimer, the term of this patent is extended or adjusted under 35 U.S.C. 154(b) by 51 days.

(21) Appl. No.: 15/007,056

(22) Filed: Jan. 26, 2016

(65) Prior Publication Data

US 2017/0208749 A1     Jul. 27, 2017

(51) Int. Cl.

| | | |
|---|---|---|
| *A01G 3/047* | (2006.01) | |
| *B01D 46/00* | (2006.01) | |
| *A01G 3/08* | (2006.01) | |
| *F24F 3/16* | (2006.01) | |
| *A01G 3/053* | (2006.01) | |

(52) U.S. Cl.
CPC .......... *A01G 3/047* (2013.01); *A01G 3/053* (2013.01); *A01G 3/08* (2013.01); *B01D 46/00* (2013.01); *F24F 3/1603* (2013.01)

(58) Field of Classification Search
CPC .......... A01G 3/047; A01G 3/053; A01G 3/08; B01D 46/00; F24F 3/1603
See application file for complete search history.

(56) References Cited

U.S. PATENT DOCUMENTS

2011/0027034 A1*  2/2011  Chamoun ............... B60P 3/077
                                                      410/104

FOREIGN PATENT DOCUMENTS

JP           2006254725 A  *  9/2006

* cited by examiner

*Primary Examiner* — D Glenn Dayoan
*Assistant Examiner* — Melissa A Black
(74) *Attorney, Agent, or Firm* — Regan L. Trumper; Cochran Freund & Young, LLC

(57) ABSTRACT

Disclosed is an apparatus and method for trimming product in a mobile unit.

11 Claims, 1 Drawing Sheet

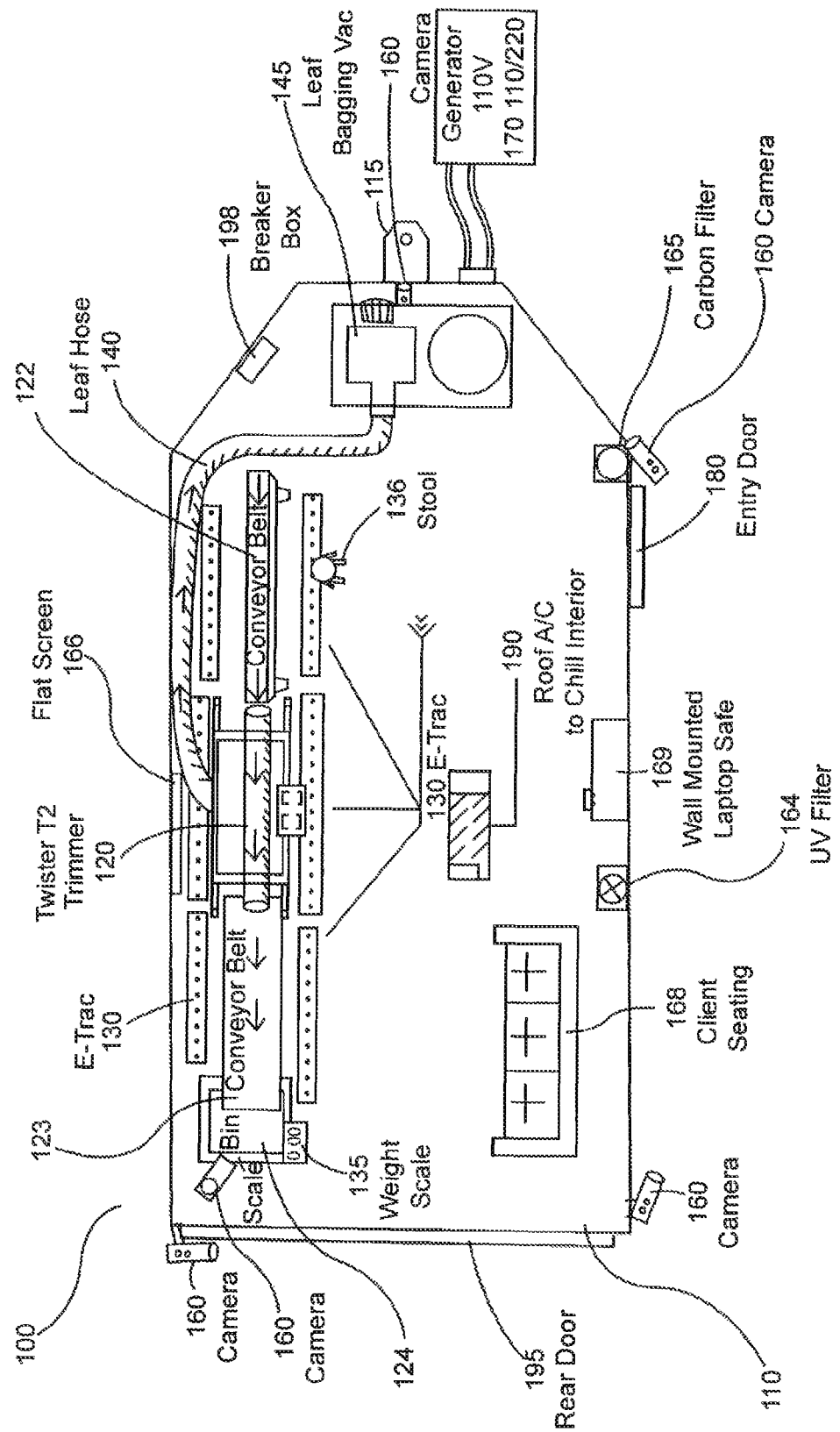

AUTOMATED TRIMMING APPARATUS AND METHOD

FIELD OF THE INVENTION

The field of the invention relates generally to mobile automated trimming.

BACKGROUND OF THE INVENTION

Automated handling of plants and animals provides many benefits. Automated handling of cotton revolutionized the cotton industry. Leaf trimming of plant products provides an end product conducive to use by a consumer. Leaf trimming may be performed by automated machinery.

SUMMARY OF THE INVENTION

An embodiment of the invention may therefore comprise a mobile automated product trimming unit, the mobile automated product trimming unit comprising a mobile base, the base comprising an attachment for connection to a transportation device, at least one product trimmer connected to the base, a first conveyor connected to the base, a second conveyor connected to the base; an end product collection area located near one of the first conveyor and the second conveyor, a bagging device enabled to remove leaf trimmed from the product and locate the leaf in a specified area, and a chilling unit enabled to provide temperature control to an interior portion of the mobile base.

An embodiment of the invention may further comprise a method of trimming product in a mobile unit, the method comprising attaching at least one product trimmer to a base of a mobile unit, wherein the mobile unit is enabled to connect to a method of transportation and the mobile unit comprises the base, at least two walls and a ceiling, at a first location; moving product along a conveyor to the trimmer, trimming the product, moving the trimmed product along a conveyor to a collection area, removing trimmings from the product to a bagging area, with a chilling unit, controlling the temperature of an interior portion of the mobile unit and weighing the trimmed product, and transporting the mobile unit to a second location.

BRIEF DESCRIPTION OF THE DRAWINGS

FIG. 1 is a diagram of a mobile automated trimming apparatus.

DETAILED DESCRIPTION OF THE EMBODIMENTS

A variety of bud, leaf and flower trimmers are available for trimming types of vegetation. Trimming away leaves from a central plant product increases the value of the plant product but generally requires excessive time and space demands on enterprises. Automated trimmers process plant products and trim excess leaves from the periphery of the plant product. Generally, an enterprise may purchase trimmers or lease trimmers.

FIG. 1 shows a diagram of a mobile automated trimming arrangement. A mobile unit 100 has a base 110. The base 110 may have a hitch 115. The hitch 105 may be any type of hitch known those skilled in the art. The hitch 105 provides the ability to attach the base 110 to a device or method of transporting, or moving, the mobile unit 100. The device or method of transporting the mobile unit 100 (not shown in FIG. 1) may be an automobile or other form of transportation. Those skilled in the art will understand the forms of transportation suitable for transporting, or moving, the mobile unit 100. As will be understood by those skilled in the art, the mobile unit 100 may be an enclosed unit. As such, the mobile unit 100 may have an environmentally controlled interior and an exterior. The mobile unit 100 may also not have an enclosing structure. An enclosing structure is not shown in FIG. 1, but those skilled in the art will understand the various types of enclosing structures that may be used with a mobile unit. For instance, the enclosing structure may be firm, such as in a trailer with solid siding pulled behind a vehicle, or may be softer sided allowing the sides to moderately sway or even roll up.

A first trimmer 120 is shown on one side of the mobile unit 100. The first trimmer 120 may be any type of automatic trimmer. Trimmers that may be used are understood by those skilled in the art and may include, Twister trimmers, GreenBroz trimmers, an EZTrim machine, a Bonsai Hero trimmer, Terminator trimmer, TrimPro trimmer, Zoom trimmer, or other type of trimmer. The trimmer 120 may be secured to the floor to eliminate movement of the trimmer 120 during transit and operation. An e-trac 130 system may be used to secure the trimmer to the base 110 of the mobile unit 100.

A first conveyor 122 is used to process items needing trimmed into the trimmer 120. As is understood by those skilled in the art, a conveyor moves items in a direction dictated by the movement of a belt. Other means of moving product to the trimmer may be used. A second conveyor 123 is situated at the other end of the trimmer 120. Trimmed product will proceed from the first conveyor 122, to the trimmer 120 and then to the second conveyor 123. The second conveyor 123 will move trimmed product from the trimmer 120 to a collection bin 124. The collection bin may be situated on a weight scale 135, or may have a built in weight scale, which will weigh any trimmed product that enters the bin. A stool 136 is situated near the first conveyor to allow an operator to sit during operation. The stool 136 is optional.

A leaf hose 140 is connected to the trimmer 120. The leaf hose 140 will collect any leaf trimmed from the product. The leaf hose 140 suctions any leaf and connects on the other end to a leaf bagging vacuum 145. The leaf bagging vac 145 will collect all of the trimmed leaf from the product.

A number of cameras 160 may be provided provided to the mobile unit 100. When cameras 160 are provided, the number of cameras may range from one, for general coverage, to many, for specific coverage. The cameras provide security and a record of occurrences in the mobile unit 100. The cameras 160 may be positioned both inside and outside of the mobile unit 100. A monitor 166, such as a flat screen television, may be position along a wall of the mobile unit 100. Preferably, the monitor 166 is position so that any person sitting in a client seating 168 area is able to view the monitor 166. A carbon filter 165 may be provided inside the mobile unit 100 to provide a safe and clean environment. A carbon filter 165 may provide filtering of carbon in the interior of the mobile unit 100 and may provide filtering of other air borne contaminants. A safe 169 may be provided to allow safe storage for information developed during trimming. The information may be contained on a laptop. The safe 169 may be attachable to a wall of the mobile unit 100 to minimize the risk of unauthorized removal. A generator 170 may be connected to the mobile unit 100 to provide electrical power to the interior of the mobile unit 100. The generator 170 may be a 110/220 type generator. The generator may provide any type of voltage conversion depending on the requirements of the equipment inside the mobile unit 100. The generator 170 may be self-contained. The generator may be attached to the exterior of the mobile unit 100 and not require hauling, or transportation, independent of the mobile unit 100. A uv filter 164 may be situated on the interior of the mobile unit 100. The uv filter 164 filters ultraviolet light from the interior of the mobile unit 100 that may be harmful to a particular type of product that may be being trimmed. It is understood that filters may provide protection for products beyond uv light. Accordingly, the uv filter may not be limited to a filter for ultraviolent light, but for any substance, or radiation, that may be harmful to a product. An entry door 180 may be provided that allows entrance and egress from the mobile unit 100. A chilling unit 190 may be provided to enable further environmental control for the interior of the mobile unit 100. The chilling unit 190 may preferably cool the interior of the mobile unit 100 to 68° Fahrenheit, and more preferably to between 62° F. and 65° F. Certain products trim better, to maintain the integrity at different temperatures. Those skilled in the art of trimming will understand that different products are preferably trimmed at certain optimum temperatures. The chilling unit 190 may be attached to the base 11 of the mobile unit 100. The chilling unit 190 may be attached to the roof of the mobile unit. A roof of the mobile unit is not shown in FIG. 1. Further, the chilling unit 190 may also provide heat to the mobile unit 100. The exterior temperature of the mobile unit may be below an optimum temperature and the chilling unit may need to raise the temperature. The chilling unit may adjust the temperature, up or down, in the interior of the mobile unit to any specified temperature depending on the needs, or requirement. of a particular product. The chilling unit 190 may also provide direct temperature control, either through tubing or venting (not shown in FIG. 1) to the conveyor belt 122 or the trimmer 120, or both, in order to directly control the temperature of the product. An airflow set to a certain temperature, such as from 62° F. to 65° F., can be applied directly to the product. A rear door 195 may also allow entrance and egress from the mobile unit 100. A breaker box 198 may be provided on the interior of the mobile unit 100. The breaker box 198 may be on the outside of the mobile unit 100.

It is understood that the mobile unit 100 shown in FIG. 1 shows one possible arrangement of the mobile unit 100 and any devices or machines (as explained above). The mobile unit may contain two or more trimmers 120 connected to separate first and second conveyors 122, 123. The arrangement may be such that the leaf bagging vacuum 145 is situated in a different location. The leaf bagging vacuum 145 may be located closer to the rear door 195. The locations of the cameras 160 may be modified from that shown in FIG. 1 to provide security and documentation as necessary to the context of a trimming operation.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A mobile automated product trimming unit, said mobile automated product trimming unit comprising:
    a mobile base, said base comprising an attachment for connection to a transportation device, said mobile base comprising an interior;
    at least one product trimmer enabled to trim previously harvested product and connected to said base, said at least one product trimmer being located in the interior of said mobile base;
    a first conveyor connected to said base, said first conveyor being located in the interior of said mobile base;
    a second conveyor connected to said base, said second conveyor being located in the interior of said mobile base;
    an end product collection area located near one of said first conveyor and said second conveyor, said end product collection area being located in the interior of said mobile base;
    a bagging device located in the interior of said mobile base and enabled to remove leaf trimmed from said product and locate said leaf in a specified area; and
    a chilling unit enabled to provide temperature control to said interior of said mobile base.

2. The mobile automated product trimming unit of claim 1, wherein said at least one trimmer is connected to said base by an e-trac system.

3. The mobile automated product trimming unit of claim 1, further comprising an enclosure comprised of at least two walls, at least one door, and a ceiling.

4. The mobile automated product trimming unit of claim 3 further comprising a plurality of cameras, wherein at least one of said plurality of cameras is outside said enclosure and at least one of said plurality of cameras is inside said enclosure.

5. The mobile automated product trimming unit of claim 3, further comprising at least one of a carbon filter and a uv filter.

6. The mobile automated product trimming unit of claim 1, further comprising a generator enabled to supply power to said trimmer.

7. The mobile automated product trimming unit of claim 1, further comprising a weight scale enabled to weigh trimmed product at said end product collection area.

8. A method of trimming product in a mobile unit, said method comprising:
    attaching at least one product trimmer to a base of a mobile unit, said mobile unit comprising an interior and wherein said mobile unit is enabled to connect to a method of transportation and said mobile unit comprises said base, at least two walls and a ceiling and said product trimmer being enabled to trim previously harvested product and said product trimmer being located in said interior of said mobile unit;
    at a first location;
    moving product along a first conveyor to said trimmer, said conveyor being located in said interior of said mobile unit;
    trimming said product;
    moving said trimmed product along a second conveyor located inside said mobile unit to a collection area;
    removing trimmings from said product to a bagging area located in said interior of said mobile unit;
    with a chilling unit, controlling the temperature of said interior portion of said mobile unit; and
    weighing said trimmed product; and
    transporting said mobile unit to a second location.

9. The method of claim 8, wherein said mobile unit further comprises a plurality of cameras, wherein at least one of said plurality of cameras is outside said enclosure and at least one of said plurality of cameras is inside said enclosure.

10. The method of claim 8, wherein said mobile unit further comprises at least one of a carbon filter and a uv filter.

11. The method of claim 8, wherein said mobile unit further comprises a generator enabled to supply power to said trimmer.

\* \* \* \* \*